(12) United States Patent
Yun et al.

(10) Patent No.: US 9,885,909 B2
(45) Date of Patent: Feb. 6, 2018

(54) LIQUID CRYSTAL DISPLAY AND MANUFACTURING METHOD THEREOF

(71) Applicant: Samsung Display Co., Ltd., Yongin-si, Gyeonggi-do (KR)

(72) Inventors: Hae Ju Yun, Hwaseong-si (KR); Byeong-Hee Won, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/389,231

(22) Filed: Dec. 22, 2016

(65) Prior Publication Data

US 2017/0102585 A1    Apr. 13, 2017

Related U.S. Application Data

(62) Division of application No. 14/261,181, filed on Apr. 24, 2014, now abandoned.

(30) Foreign Application Priority Data

Oct. 22, 2013  (KR) .................. 10-2013-0126048

(51) Int. Cl.

| G02F 1/1335 | (2006.01) |
|---|---|
| G02F 1/1337 | (2006.01) |
| G02F 1/1333 | (2006.01) |
| G02F 1/1341 | (2006.01) |
| G02F 1/1343 | (2006.01) |
| G02F 1/1368 | (2006.01) |

(52) U.S. Cl.
CPC ...... *G02F 1/133555* (2013.01); *G02F 1/1341* (2013.01); *G02F 1/1368* (2013.01); *G02F 1/13439* (2013.01); *G02F 1/133345* (2013.01); *G02F 1/133371* (2013.01); *G02F 1/133377* (2013.01); *G02F 2001/133368* (2013.01); *G02F 2201/121* (2013.01); *G02F 2201/123* (2013.01)

(58) Field of Classification Search
CPC .......... G02F 1/133377; G02F 1/13371; G02F 1/1341; G02F 1/133555; G02F 1/13439; G02F 2001/133368
See application file for complete search history.

(56) References Cited

U.S. PATENT DOCUMENTS

| 5,539,546 A | 7/1996 | Koden et al. |
| 2003/0038912 A1 | 2/2003 | Broer et al. |
| 2006/0119771 A1 | 6/2006 | Lim et al. |

(Continued)

FOREIGN PATENT DOCUMENTS

| CN | 103926725 A | 7/2014 |
| JP | 2013-148890 A | 8/2013 |

(Continued)

*Primary Examiner* — Jessica M Merlin
(74) *Attorney, Agent, or Firm* — Innovation Counsel LLP

(57) ABSTRACT

A liquid crystal display is provided. The liquid crystal display includes a substrate including a reflective area and a transmissive area, a thin film transistor disposed on the substrate, a pixel electrode disposed on the thin film transistor, and a roof layer disposed facing the pixel electrode. The liquid crystal display further includes a plurality of microcavities formed between the pixel electrode and the roof layer, and a liquid crystal material disposed in the plurality of microcavities. The reflective area includes a first cell gap, and the transmissive area includes a second cell gap that is different from the first cell gap.

6 Claims, 17 Drawing Sheets

(56) References Cited

U.S. PATENT DOCUMENTS

| | | | |
|---|---|---|---|
| 2008/0316402 A1* | 12/2008 | Fan Jiang | G02F 1/133555 349/114 |
| 2009/0141214 A1 | 6/2009 | Suzuki et al. | |
| 2012/0062448 A1* | 3/2012 | Kim | G02F 1/133377 345/55 |
| 2013/0182203 A1 | 7/2013 | Lee et al. | |
| 2013/0323997 A1 | 12/2013 | Yamamoto et al. | |
| 2014/0198286 A1 | 7/2014 | Lee et al. | |

FOREIGN PATENT DOCUMENTS

| | | |
|---|---|---|
| KR | 10-2012-0026880 A | 3/2012 |
| KR | 10-2012-0138071 A | 12/2012 |
| KR | 10-2013-0124827 A | 11/2013 |
| KR | 10-2014-0092662 A | 7/2014 |

\* cited by examiner ial is disposed in the plurality of microcavities, and wherein the reflective area includes a first cell gap, and the transmissive area includes a second cell gap that is different from the first cell gap.

LIQUID CRYSTAL DISPLAY AND MANUFACTURING METHOD THEREOF

CROSS-REFERENCE TO RELATED APPLICATION

This application is a divisional of U.S. patent application Ser. No. 14/261,181, filed on Apr. 24, 2014, which claims priority to and the benefit of Korean Patent Application No. 10-2013-0126048 filed in the Korean Intellectual Property Office on Oct. 22, 2013, the entire contents of which are incorporated herein by reference.

BACKGROUND (a) Field

The present disclosure relates to a liquid crystal display and a manufacturing method thereof.

(b) Description of the Related Art

A liquid crystal display, which is one of the most common types of flat panel displays currently in use, typically includes two sheets of display panels with field generating electrodes (such as a pixel electrode and a common electrode) and a liquid crystal layer interposed therebetween.

The liquid crystal display generates an electric field in the liquid crystal layer by applying a voltage to the field generating electrodes. The electric field determines the alignment of liquid crystal molecules in the liquid crystal layer, which controls polarization of incident light, thereby enabling images to be displayed.

The liquid crystal display can be manufactured using different methods. For example, a method of forming a pixel unit having a cavity and filling a liquid crystal therein has been developed. Specifically, the method may include forming a sacrificial layer (comprising an organic material and the like) on a lower plate, removing the sacrificial layer after forming a support member thereon, and filling a liquid crystal in the empty space (formed by the removal of the sacrificial layer) through a liquid crystal injection hole.

Different types of liquid crystal display devices may possess different display characteristics. For example, a transmissive liquid crystal display including a backlight may have high luminance and high contrast ratio indoors (e.g. inside a building), but low luminance and low contrast ratio outdoors. On the other hand, a reflective liquid crystal display may have good electro-optical characteristics outdoors (by using natural light from the surroundings as a light source), but poor electro-optical characteristic indoors.

Accordingly, there is a need for a liquid crystal display combining the above-described advantages of both the transmissive and reflective liquid crystal displays without having their inherent deficiencies.

SUMMARY

The present disclosure is directed to address at least the above need, by providing a double cell gap structure in a transflective liquid crystal display using sacrificial layers of different thicknesses.

According to some embodiments of the inventive concept, a liquid crystal display is provided. The liquid crystal display includes a substrate including a reflective area and a transmissive area; a thin film transistor disposed on the substrate; a pixel electrode disposed on the thin film transistor; and a roof layer disposed facing the pixel electrode, wherein a plurality of microcavities are formed between the pixel electrode and the roof layer, and a liquid crystal In some embodiments, the first cell gap may correspond to a height of the microcavities in the reflective area, and the second cell gap may correspond to a height of the microcavities in the transmissive area.

In some embodiments, the first cell gap may be smaller than the second cell gap.

In some embodiments, a thickness of the roof layer in the reflective area may be different from a thickness of the roof layer in the transmissive area.

In some embodiments, the pixel electrode may include a transparent electrode and a reflective electrode disposed on a first portion of the transparent electrode, and the first portion of the transparent electrode and the reflective electrode may be disposed in the reflective area, and a second portion of the transparent electrode may be disposed in the transmissive area.

In some embodiments, each of the reflective area and the transmissive area may correspond to one unit pixel area.

In some embodiments, the reflective area may include one of a pixel area adjacent in a horizontal direction and a pixel area adjacent in a vertical direction, and the transmissive area may include the other one of the pixel area adjacent in the horizontal direction and the pixel area adjacent in the vertical direction.

In some embodiments, the liquid crystal display may further include a common electrode and a lower insulating layer disposed between the microcavity and the roof layer, wherein the lower insulating layer may be disposed on the common electrode.

In some embodiments, the liquid crystal display may further include a capping layer disposed on the roof layer, wherein a liquid crystal injection hole formation region may be disposed between the plurality of microcavities, and the capping layer may be disposed covering the liquid crystal injection hole formation region.

In some embodiments, the liquid crystal injection hole formation region may extend in a direction parallel to a gate line connected to the thin film transistor.

According to some other embodiments of the inventive concept, a method of manufacturing a liquid crystal display is provided. The method includes forming a thin film transistor on a substrate; forming a pixel electrode, wherein the pixel electrode is connected to a terminal of the thin film transistor; forming a sacrificial layer on the pixel electrode, wherein the sacrificial layer includes a first portion having a first thickness and a second portion having a second thickness; forming a roof layer on the sacrificial layer; forming, by removing the sacrificial layer, a plurality of microcavities having a liquid crystal injection hole; and injecting an alignment material and a liquid crystal material into the plurality of microcavities through the liquid crystal injection hole, wherein the first portion of the sacrificial layer corresponds to a reflective area, and the second portion of the sacrificial layer corresponds to a transmissive area.

In some embodiments, the first thickness may correspond to a cell gap of the reflective area, and the second thickness may correspond to a cell gap of the transmissive area.

In some embodiments, a thickness of the roof layer in the reflective area may be greater than a thickness of the roof layer in the transmissive area.

In some embodiments, forming the sacrificial layer on the pixel electrode may further include forming the first portion and the second portion alternately in a direction of a gate line connected to the thin film transistor.

In some embodiments, forming the sacrificial layer on the pixel electrode may further include forming the first portion and the second portion alternately in a direction of a data line connected to the thin film transistor.

In some embodiments, the method may further include forming a common electrode and a lower insulating layer on the sacrificial layer before forming the roof layer.

In some embodiments, the method may further include forming a capping layer on the roof layer to cover the liquid crystal injection hole.

In some embodiments, a liquid crystal injection hole formation region may be formed between the plurality of microcavities, and the capping layer may be formed covering the liquid crystal injection hole formation region.

DETAILED DESCRIPTION

Figure 1:
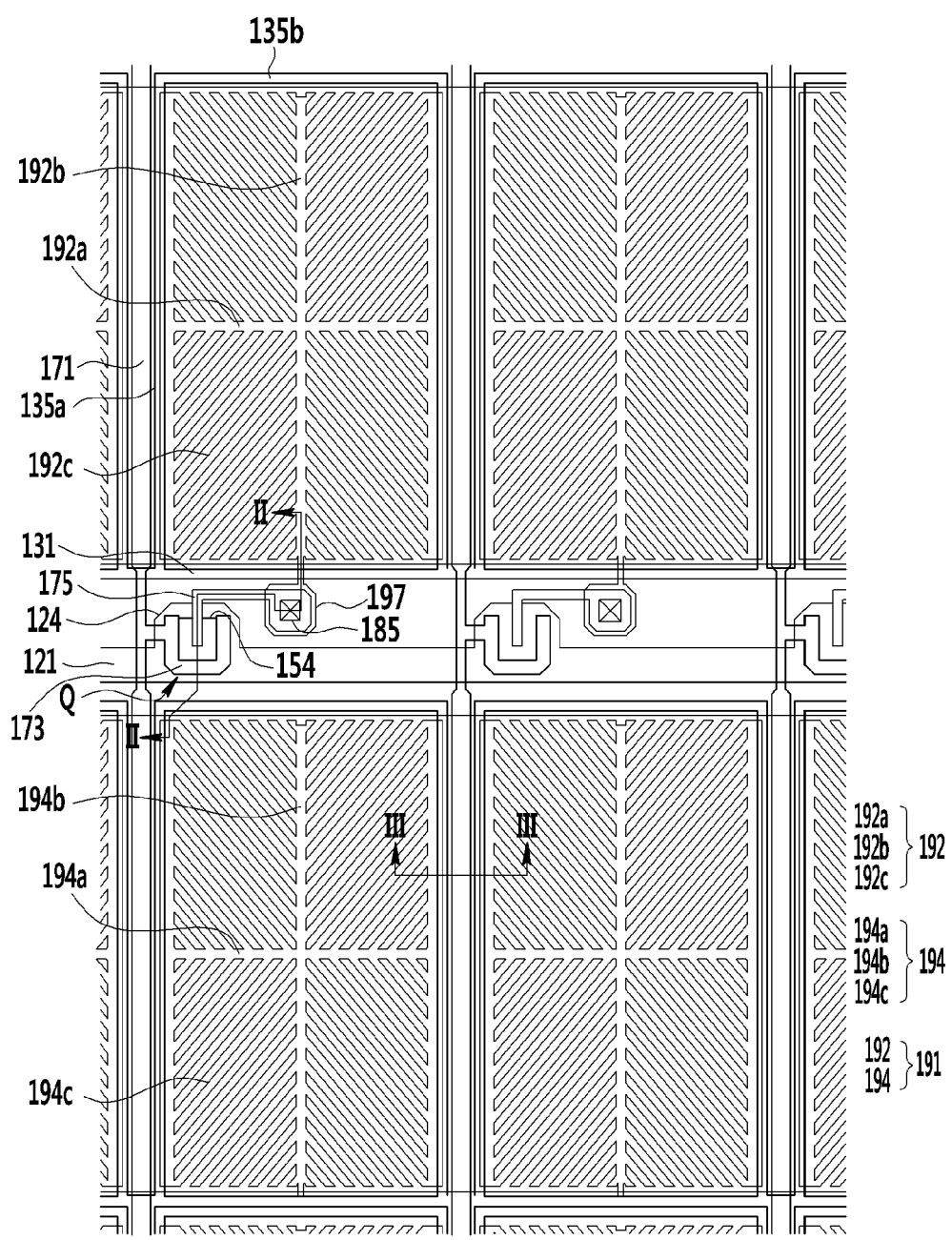
FIG. 1 is a plan view illustrating a liquid crystal display according to an exemplary embodiment of the inventive concept.

Exemplary embodiments of the inventive concept will be described in detail herein with reference to the accompanying drawings. As those skilled in the art would realize, the described embodiments may be modified in various ways without departing from the spirit or scope of the inventive concept.

In the drawings, the thickness of layers, films, panels, regions, etc., may be exaggerated for clarity. It will be understood that when a layer is referred to as being "on" another layer or substrate, it can be disposed directly on the other layer or substrate, or with one or more intervening layers or substrates being present. Like reference numerals designate like elements throughout the specification.

Figure 2:
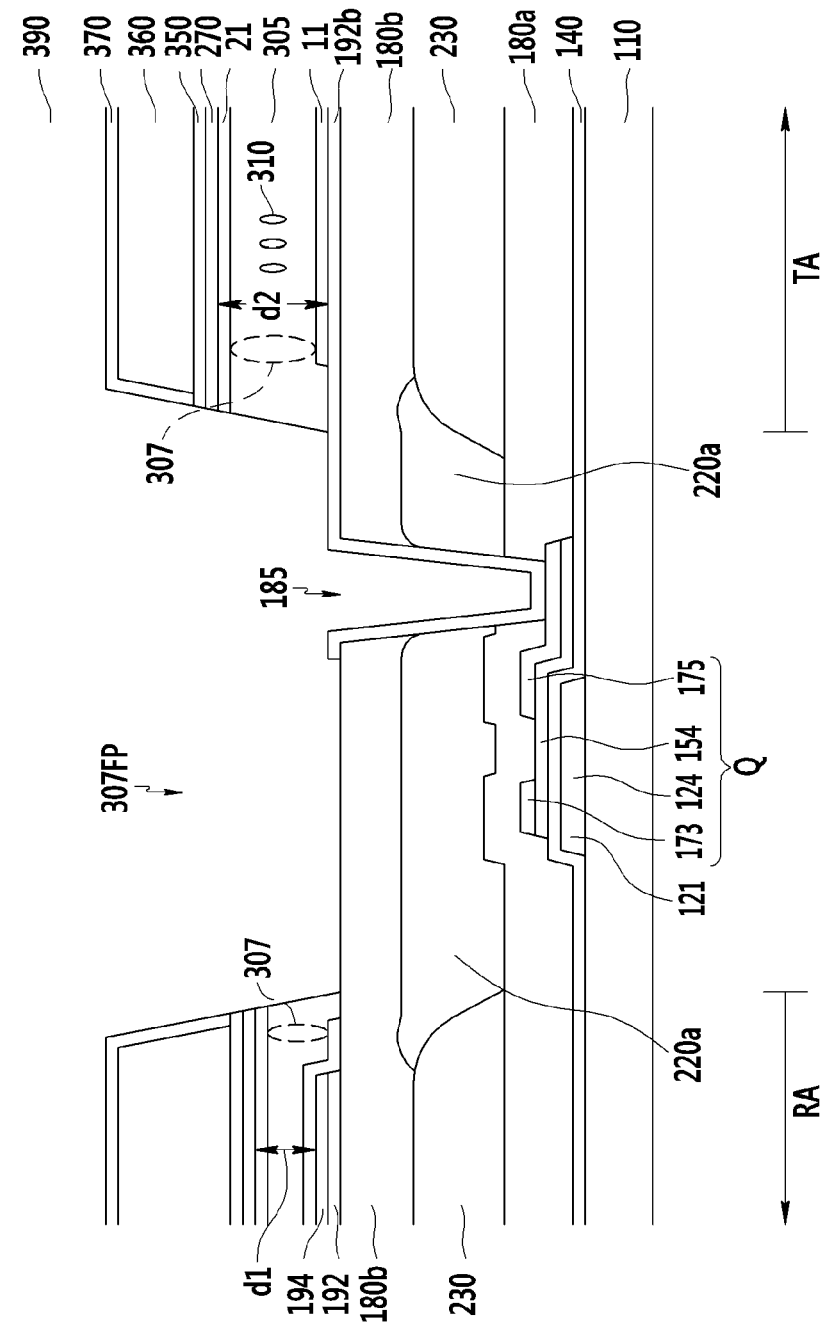
FIG. 2 is a cross-sectional view of the liquid crystal display of FIG. 1 taken along line II-II.
Figure 3:
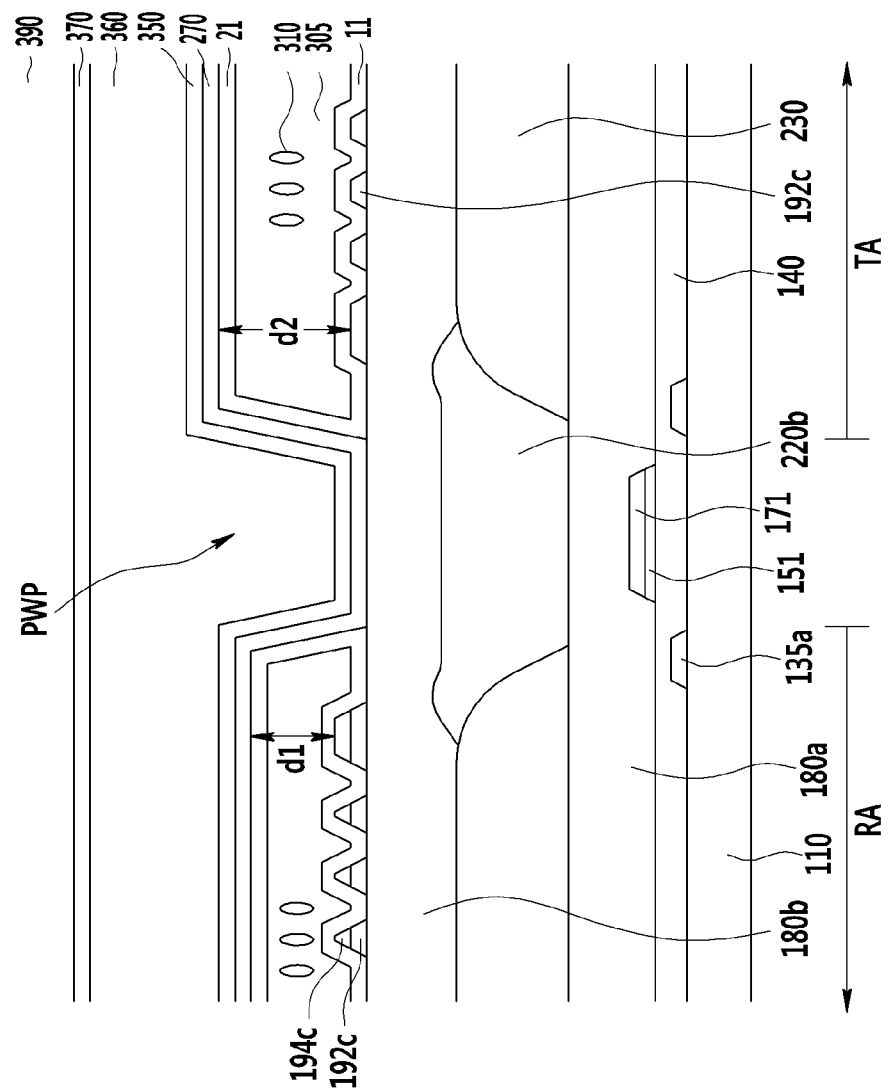
FIG. 3 is a cross-sectional view of the liquid crystal display of FIG. 1 taken along line III-III.
Figure 4:
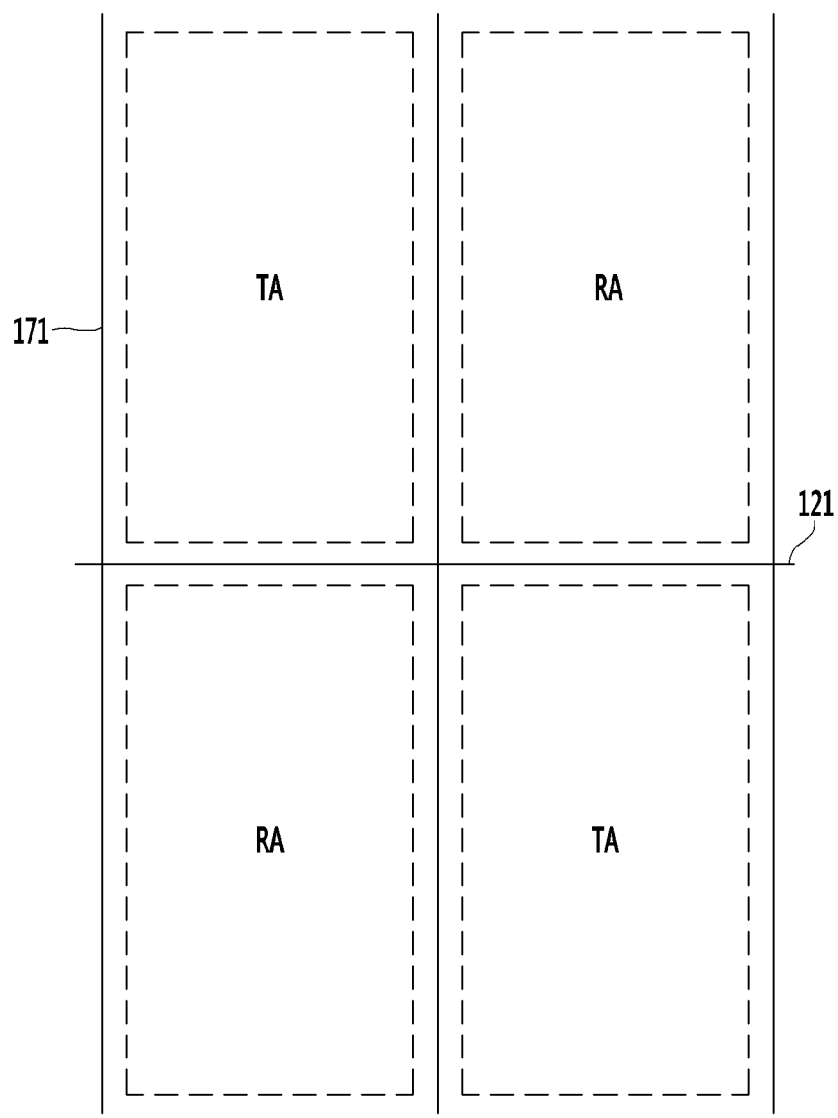
FIG. 4 is a plan view schematically illustrating a reflective area and a transmissive area in the liquid crystal display of FIG. 1.

FIG. 1 is a plan view illustrating a liquid crystal display according to an exemplary embodiment of the inventive concept. FIG. 2 is a cross-sectional view of the liquid crystal display of FIG. 1 taken along line II-II. FIG. 3 is a cross-sectional view of the liquid crystal display of FIG. 1 taken along line FIG. 4 is a plan view schematically illustrating a reflective area and a transmissive area in the liquid crystal display of FIG. 1.

The liquid crystal display includes a plurality of pixels PX disposed in a display area DA, which will be described in detail with reference to FIGS. 1 to 3.

Referring to FIGS. 1 to 3, a gate line 121 and a storage electrode line 131 are formed on a substrate 110. The substrate 110 may be formed of transparent glass, plastic, or the like. The gate line 121 includes a gate electrode 124. The storage electrode line 131 transfers a predetermined voltage (such as a common voltage Vcom), and extends in a substantially horizontal direction. The storage electrode line 131 also includes a pair of vertical portions 135a extending substantially perpendicular to the gate line 121, and a pair of horizontal portions 135b connecting the ends of the vertical portions 135a. The vertical and horizontal portions 135a and 135b of the storage electrode line 131 are formed surrounding a pixel electrode 191.

A gate insulating layer 140 is formed on the gate line 121 and the storage electrode line 131. Semiconductor layers (151 and 154) and data conductors (171, 173, and 175) are formed on the gate insulating layer 140. Referring to FIG. 3, a semiconductor layer 151 is formed on the gate insulating layer 140, and a data line 171 is formed on the semiconductor layer 151. Referring to FIG. 2, a semiconductor layer 154 is formed on the gate insulating layer 140, and a source electrode 173 and a drain electrode 175 are formed on the semiconductor layer 154. The data line 171 is connected to the source electrode 173.

In some embodiments, a plurality of ohmic contacts (not shown) may be formed on the respective semiconductor layers 151 and 154, and between the data line 171 and the source/drain electrodes 173 and 175.

The gate electrode 124, the source electrode 173, and the drain electrode 175, together with the semiconductor layer 154, collectively constitute a thin film transistor Q. A channel of the thin film transistor Q is formed in a portion of the semiconductor layer 154 between the source electrode 173 and the drain electrode 175.

A first interlayer insulating layer 180a is formed on the data conductors 171, 173, and 175, and on an exposed portion of the semiconductor layer 154. The first interlayer insulating layer 180a may include an inorganic insulator (such as silicon nitride (SiNx) or silicon oxide (SiOx)) or an organic insulator.

A color filter 230 and a plurality of light blocking members are formed on the first interlayer insulating layer 180a. The plurality of light blocking members include a horizontal light blocking member 220a and a vertical light blocking member 220b.

The light blocking members 220a and 220b are formed in a lattice structure of the color filter 230. The lattice structure includes openings corresponding to an area for displaying images. The light blocking members 220a and 220b are formed of an opaque material (that does not transmit light). The light blocking members 220a and 220b are formed in the openings of the color filter 230. In particular, the horizontal light blocking member 220a is formed in a direction parallel to the gate line 121, and the vertical light blocking member 220b is formed in a direction parallel to the data line 171.

The color filter 230 may display one of the primary colors (such as the three primary colors red, green, and blue). However, the color filter 230 need not be limited to the three primary colors red, green, and blue. In some embodiments, the color filter 230 may display one of cyan, magenta, yellow, and white-based colors. The color filter 230 may be formed of a material capable of displaying a different color for every adjacent pixel.

A second interlayer insulating layer 180b is formed on the color filter 230 and the light blocking members 220a and 220b, covering the color filter 230 and the light blocking members 220a and 220b. The second interlayer insulating layer 180b may include an inorganic insulator (such as silicon nitride (SiNx) or silicon oxide (SiOx)) or an organic insulator. As shown in FIG. 2, a step is created due to a thickness difference between the color filter 230 and the light blocking members 220a and 220b. Nevertheless, the effect of the step on surface planarity can be mitigated by forming the second interlayer insulating layer 180b over the step.

A contact hole 185 exposing the drain electrode 175 is formed in the color filter 230, the light blocking members 220a, and the interlayer insulating layers 180a and 180b.

The pixel electrode 191 is formed on the second interlayer insulating layer 180b.

The pixel electrode 191 may be formed having a quadrangle shape. The pixel electrode 191 includes a plurality of horizontal stems 192a and 194a, and a plurality of vertical stems 192b and 194b crossing the horizontal stems 192a and 194a. Further, the pixel electrode 192 is divided into four subregions by the horizontal stems 192a and 194a and the vertical stems 192b and 194b, and each subregion includes a plurality of minute branches 192c and 194c. In some embodiments, the pixel electrode 191 may further include an outer stem surrounding the pixel electrode 191.

The minute branches 192c of the pixel electrode 191 form an angle of approximately 40° to 45° with the gate line 121 or the horizontal stem 192a. Also, the minute branches of two adjacent subregions may be perpendicular to each other. Furthermore, a distance between the minute branches 192c and 194c may vary with an increase in a linewidth of the minute branches.

The pixel electrode 191 includes an extension 197 connected at lower ends of the vertical stems 192b and 194b. The extension 197 has a larger area than the vertical stems 192b and 194b. The pixel electrode 191 is physically and electrically connected with the drain electrode 175 through the contact hole 185 at the extension 197, so as to receive a data voltage from the drain electrode 175.

In some embodiments, the pixel electrode 191 includes a transparent electrode 192 and a reflective electrode 194 disposed on a portion of the transparent electrode 192. Accordingly, a transflective liquid crystal display is formed, comprising a reflective area RA and a transmissive area TA formed on the substrate 110.

In the reflective area RA, the pixel electrode 191 includes the transparent electrode 192 and the reflective electrode 194 disposed on the portion of the transparent electrode 192. In the transmissive area TA, the transparent electrode 192 may be formed as the pixel electrode 191. The transparent electrode 192 may be formed of a transparent conductive material (such as ITO or IZO), and the reflective electrode 194 may be formed of a reflective metal (such as aluminum, silver, chromium, or an alloy thereof). In some embodiments (not illustrated), the reflective electrode 194 may have a dual-layer structure including a low-resistive reflective upper layer and a lower layer. The low-resistive reflective upper layer may be formed of aluminum, silver, or an alloy thereof. The lower layer may be formed of a material having excellent contact characteristics with ITO or IZO (such as molybdenum-based metals, chromium, tantalum, or titanium).

Although not illustrated in the figures, an upper surface of the second interlayer insulating layer 180b disposed at the portion corresponding to the reflective area RA may have a curved surface. Also, the transparent electrode 192 and the reflective electrode 194 disposed on the second interlayer insulating layer 180b may be curved along the upper surface of the second interlayer insulating layer 180b.

In the transmissive area TA, light that is incident from a rear side of the substrate 110 passes through liquid crystal molecules 310 of a microcavity 305, and is then emitted to a front side (towards a capping layer 390), thereby displaying an image.

In the reflective area RA, external light that is input from the front side enters into the microcavity 305 and is reflected by the reflective electrode 194. The reflected light then passes through the liquid crystal molecules 310 of the microcavity 305 again and is emitted to the front side, thereby displaying the image. In this case, the curved surface of the reflective electrode 194 induces diffused reflection of light, so as to prevent a phenomenon in which an object is reflected on the screen.

In some embodiments, the reflective area RA and the transmissive area TA may each include one or more unit pixel areas. Referring to FIGS. 1 and 4, the transmissive area TA may include a unit pixel area disposed on an upper left quadrant and a unit pixel area disposed on a lower right quadrant diagonal to the upper left quadrant. The reflective area RA may include a unit pixel area disposed on a lower left quadrant and a unit pixel area disposed on an upper right quadrant diagonal to the lower left quadrant. Although FIGS. 1 and 4 illustrate 2×2 pixel areas, it should be understood that the layout of the reflective area RA and the transmissive area TA described above (i.e. the 2×2 pixel areas) may be repeated across the entire pixel areas.

Furthermore, the thin film transistor Q and the pixel electrode 191 described above are merely exemplary. In some embodiments, a structure of the thin film transistor Q and a design of the pixel electrode 191 may be modified to improve side visibility.

A lower alignment layer 11 is formed on the pixel electrode 191. The lower alignment layer 11 may correspond to a vertical alignment layer. The lower alignment layer 11 serves as a liquid crystal alignment layer, and may be formed of materials such as polyamic acid, polysiloxane, polyimide, or the like.

An upper alignment layer 21 is disposed at a portion facing the lower alignment layer 11, and the microcavity 305 is formed between the lower alignment layer 11 and the upper alignment layer 21. A liquid crystal material including the liquid crystal molecules 310 is injected into the microcavity 305 through a liquid crystal injection hole 307. The microcavity 305 may be formed in a column direction, that is, a vertical direction of the pixel electrode 191. In some embodiments, the alignment material (for forming the alignment layers 11 and 21) and the liquid crystal material (including the liquid crystal molecules 310) may be injected into the microcavity 305 via capillary force.

In some embodiments, a height of a first cell gap in the reflective area RA may be different from a height of a second cell gap in the transmissive area TA. For example, the first cell gap may correspond to a first height d1 of the microcavity 305 in the reflective area RA, the second cell gap may correspond to a second height d2 of the microcavity 305 in the transmissive area TA, and the first cell gap may be smaller than the second cell gap such that d1 is less than d2.

In some embodiments, the reflective area RA may be designed for $\lambda/4$ wavelengths and the transmissive area TA may be designed for $\lambda/2$ wavelengths, so as to equalize the polarization states of light reaching a last polarizer in the reflective area RA and the transmissive area TA. Specifically, the reflective area RA and the transmissive area TA may be designed for $\lambda/4$ and $\lambda/2$ wavelengths, respectively, by setting the height of the first cell gap of the reflective area RA (d1) to be ½ of the height of the second cell gap of the transmissive area TA (d2).

The microcavity 305 is divided in a vertical direction by a plurality of liquid crystal injection hole formation regions 307FP disposed at the portion overlapping with the gate line 121. As such, a plurality of microcavities 305 are formed in a direction in which the gate line 121 extends. Each of the microcavities 305 may correspond to one or two or more pixel areas, and the pixel areas may correspond to the area for displaying an image.

A common electrode 270 and a lower insulating layer 350 are disposed on the upper alignment layer 21. The common electrode 270 receives a common voltage and generates an electric field together with the pixel electrode 191 (to which the data voltage is applied). The electric field determines the tilt directions of the liquid crystal molecules 310 disposed in the microcavity 305 between the two electrodes 270 and 191. The common electrode 270 and the pixel electrode 191 collectively form a capacitor to maintain the applied voltage even after the thin film transistor is turned off. The lower insulating layer 350 may be formed of silicon nitride (SiNx) or silicon oxide (SiO2).

In some embodiments, the common electrode 270 is formed on the microcavity 305. In some other embodiments, the common electrode 270 may be formed below the microcavity 305 and thus the liquid crystal may be driven according to an in-plane switching mode.

A roof layer 360 is disposed on the lower insulating layer 350. The roof layer 360 serves to support the microcavity 305. As previously described, the microcavity 305 is formed as a space between the pixel electrode 191 and the common electrode 270. The roof layer 360 may be formed of a photoresist or other organic materials. In some embodiments, a thickness of the roof layer 360 may vary according to the cell gaps of the reflective area RA and the transmissive area TA. For example, a thickness of a portion of the roof layer 360 corresponding to the reflective area RA (having a small cell gap) may be greater than a thickness of another portion of the roof layer 360 corresponding to the transmissive area TA (having a large cell gap).

An upper insulating layer 370 is disposed on the roof layer 360. The upper insulating layer 370 may contact an upper surface of the roof layer 360. The upper insulating layer 370 may be formed of silicon nitride (SiNx) or silicon oxide (SiO2).

In some embodiments, the capping layer 390 is disposed in the liquid crystal injection hole formation region 307FP covering the liquid crystal injection hole 307 of the microcavity 305. The capping layer 390 may include an organic material or an inorganic material.

In some embodiments (for example, as illustrated in FIG. 3), a partition wall formation portion PWP is disposed between microcavities 305 adjacent to each other in a horizontal direction. The partition wall formation portion PWP may extend in a same direction as the data line 171, and may be covered by the roof layer 360. The lower insulating layer 350, the common electrode 270, the upper insulating layer 370, and the roof layer 360 are disposed in the partition wall formation portion PWP. The partition wall formation portion PWP serves as a partition wall structure to partition or define the microcavity 305. In some embodiments, a partition wall structure (such as the partition wall formation portion PWP) between the microcavities 305 may allow the liquid crystal display to be more flexible. Accordingly, in those embodiments, the heights of the cell gaps can be more uniformly maintained, and the stress generated in the display is small even when the substrate 110 is bent.

Figure 5:
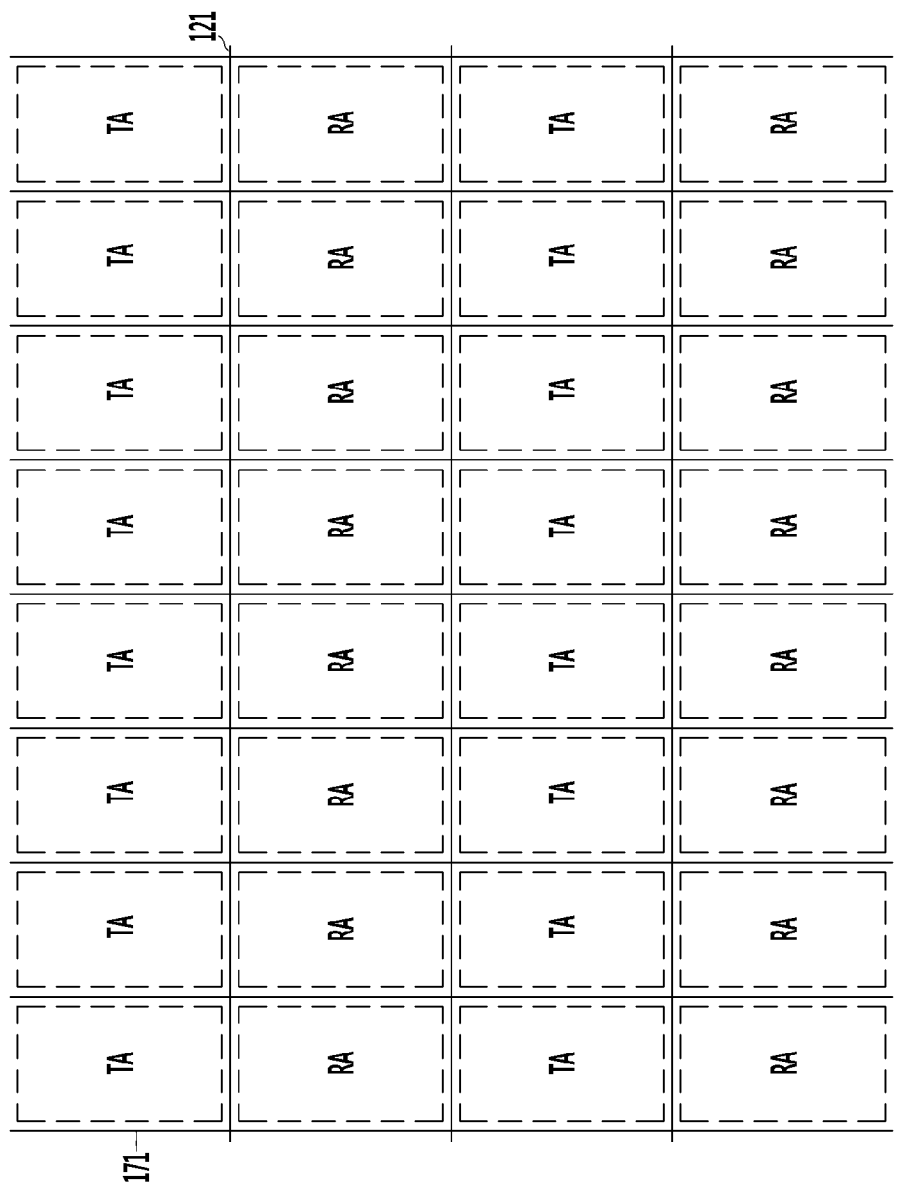
FIG. 5 is a plan view illustrating an exemplary embodiment in which the layout of the reflective area and the transmissive area in FIG. 4 is modified.

FIG. 5 is a plan view illustrating an exemplary embodiment in which the layout of the reflective area and the transmissive area in FIG. 4 is modified.

Referring to FIG. 5, the reflective area RA or transmissive area TA may be disposed along a direction in which the gate line 121 extends, and the reflective area RA and the transmissive area TA may be alternately disposed along a direction in which the data line 171 extends.

Figure 6:
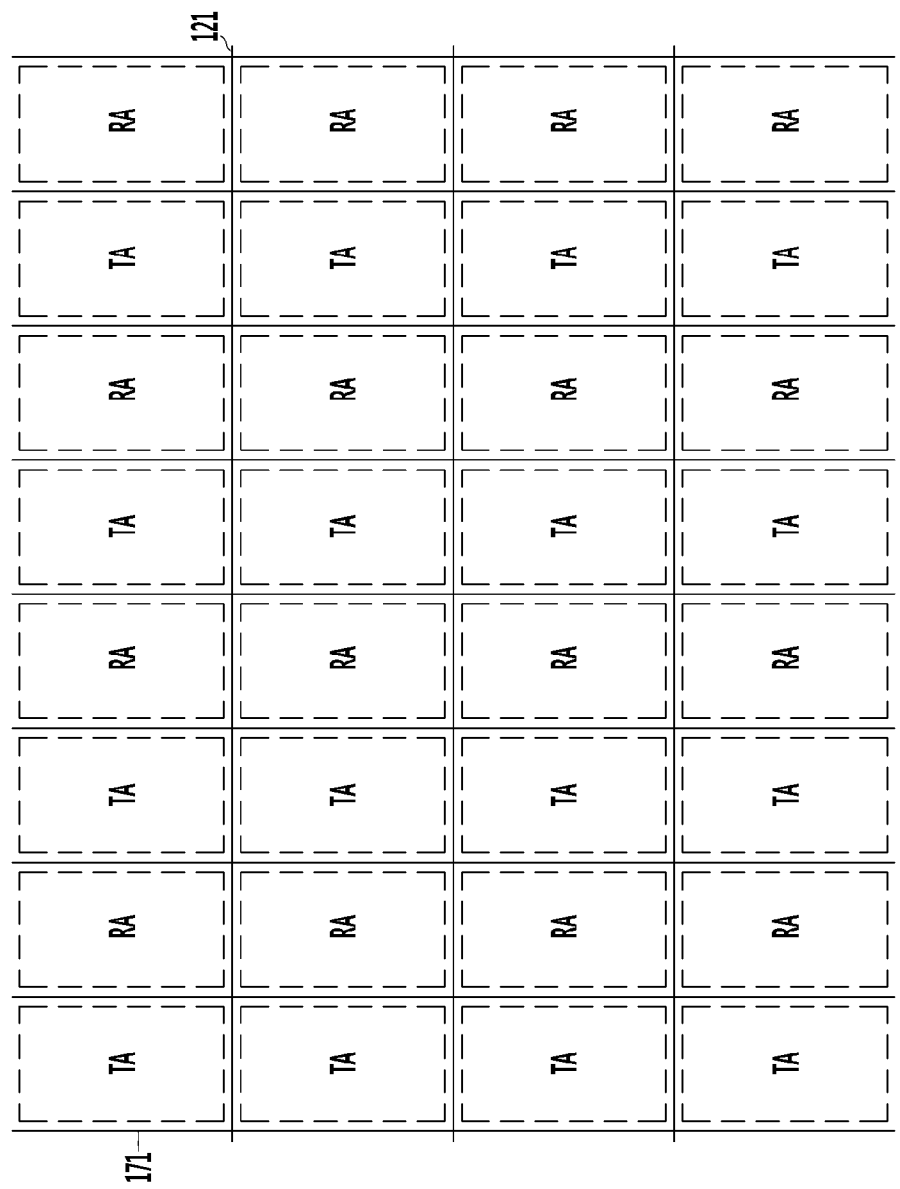
FIG. 6 is a plan view illustrating another exemplary embodiment in which the layout of the reflective area and the transmissive area in FIG. 4 is modified.

FIG. 6 is a plan view illustrating another exemplary embodiment in which the layout of the reflective area and the transmissive area in FIG. 4 is modified.

Referring to FIG. 6, the reflective area RA or transmissive area TA may be disposed along a direction in which the data line 171 extends, and the reflective area RA and the transmissive area TA may be alternately disposed along a direction in which the gate line 121 extends.

Next, a method of manufacturing a liquid crystal display according to an exemplary embodiment of the inventive concept will be described with reference to FIGS. 7 to 17. Specifically, FIGS. 7, 9, 11, 13, 14, and 16 depict cross-sectional views of the liquid crystal display of FIG. 1 taken along line II-II, and FIGS. 8, 10, 12, 15, and 17 depict cross-sectional views of the liquid crystal display of FIG. 1 taken along line at different stages of manufacturing.

Figure 7:
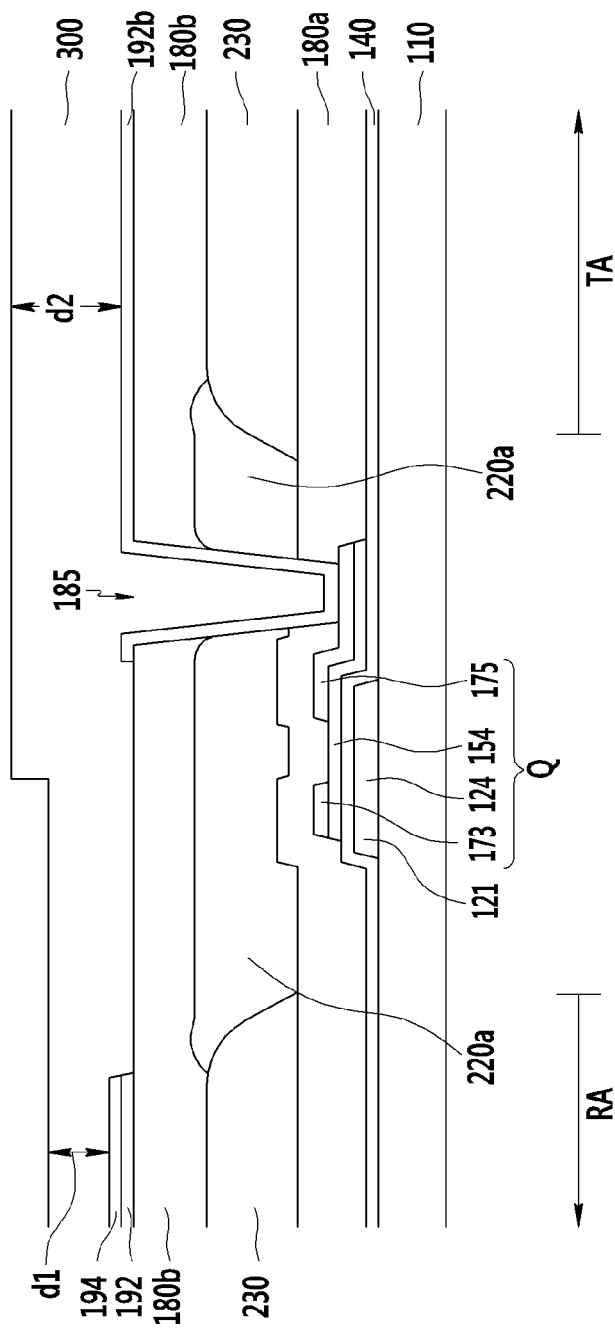
FIGS. 7 to 17 are cross-sectional views illustrating a method of manufacturing a liquid crystal display according to an exemplary embodiment of the inventive concept.
Figure 8:
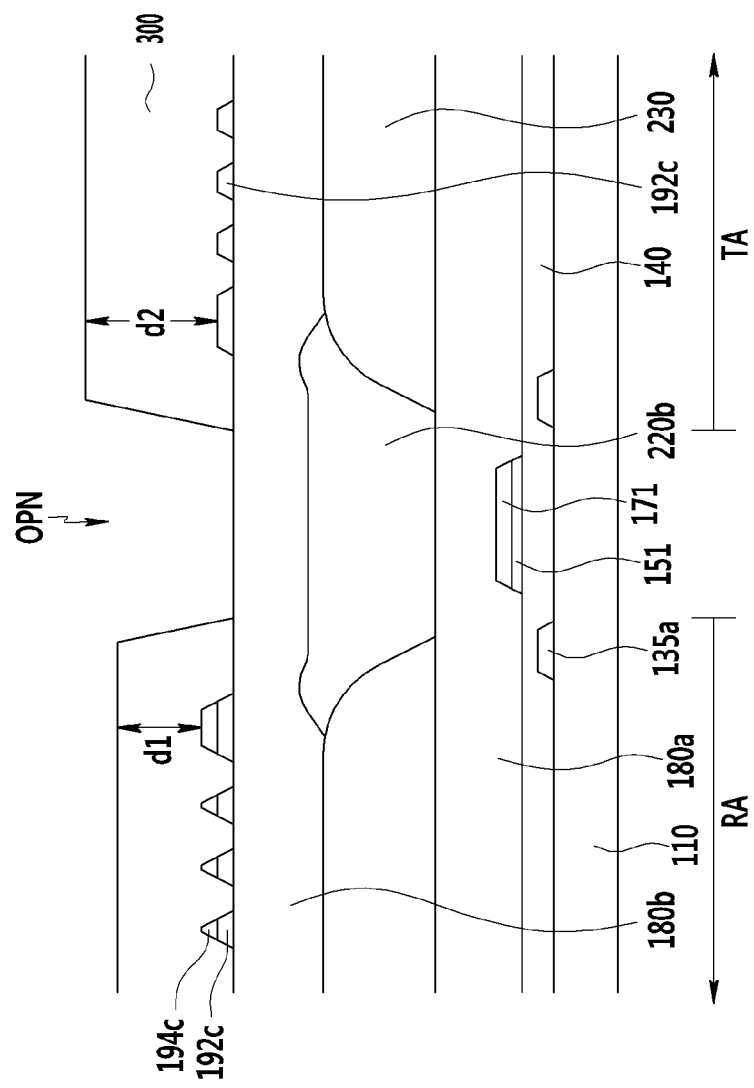

Referring to FIGS. 1, 7, and 8, the gate line 121 is formed extending in a horizontal direction on the substrate 110, the gate insulating layer 140 is formed on the gate line 121, the semiconductor layers 151 and 154 are formed on the gate insulating layer 140, and the source electrode 173 and the drain electrode 175 are formed on the semiconductor layer 154. The data line 171 is formed on the semiconductor layer 151, and is connected to the source electrode 173. Also, the data line 171 may be formed crossing the gate line 121 and extending in a vertical direction.

Next, the first interlayer insulating layer 180a is formed on the data conductors (source electrode 173, drain electrode 175, and data line 171) and on the exposed portion of the semiconductor layer 154.

Next, the color filter 230 is formed on the first interlayer insulating layer 180a at a position corresponding to the pixel area. The light blocking members 220a and 220b are formed in the openings between the color filters 230.

Next, the second interlayer insulating layer 180b is formed on the color filter 230 and the light blocking members 220a and 220b, covering the color filter 230 and the light blocking members 220a and 220b. The contact hole 185 is formed in the second interlayer insulating layer 180b, and allows the pixel electrode 191 to be electrically and physically connected to the drain electrode 175. The upper surface of the second interlayer insulating layer 180b disposed at a portion of the reflective area RA may be formed having a curved surface (not shown).

Next, the pixel electrode 191 is formed on the second interlayer insulating layer 180b.

In the reflective area RA, the pixel electrode 191 includes the transparent electrode 192 and the reflective electrode 194 disposed on a portion of the transparent electrode 192. In the transmissive area TA, the pixel electrode 191 is formed as the transparent electrode 192.

Next, a sacrificial layer 300 is formed on the pixel electrode 191. As illustrated in FIG. 8, an open portion OPN is formed in the sacrificial layer 300. The open portion OPN is formed in a direction parallel to the data line 171. Next, as illustrated in FIG. 10, the common electrode 270, the lower insulating layer 350, the roof layer 360, and the upper insulating layer 370 are formed in the open portion OPN so as to form the partition wall formation portion PWP.

In some embodiments, the sacrificial layer 300 is formed having different thicknesses in the reflective area RA and the transmissive area TA. To form the sacrificial layer 300 having different thicknesses, a slit mask or a halftone mask may be used.

Figure 9:
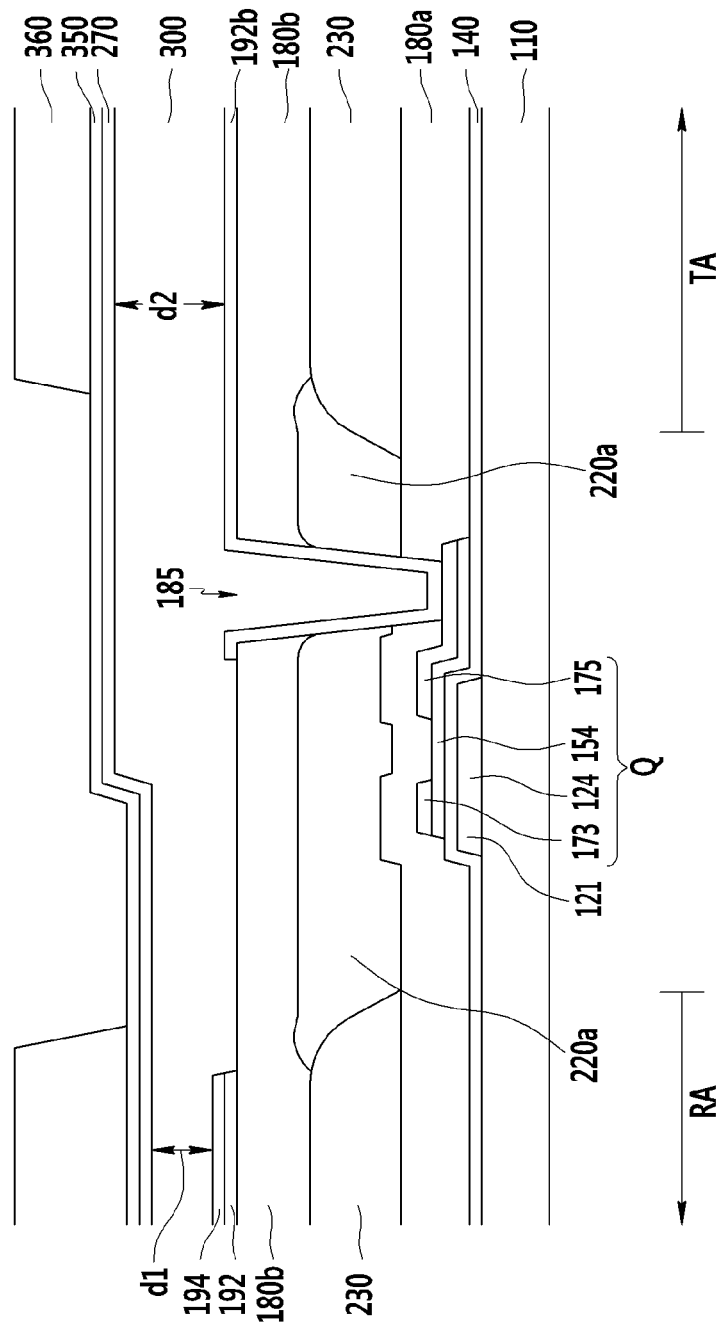
Figure 10:
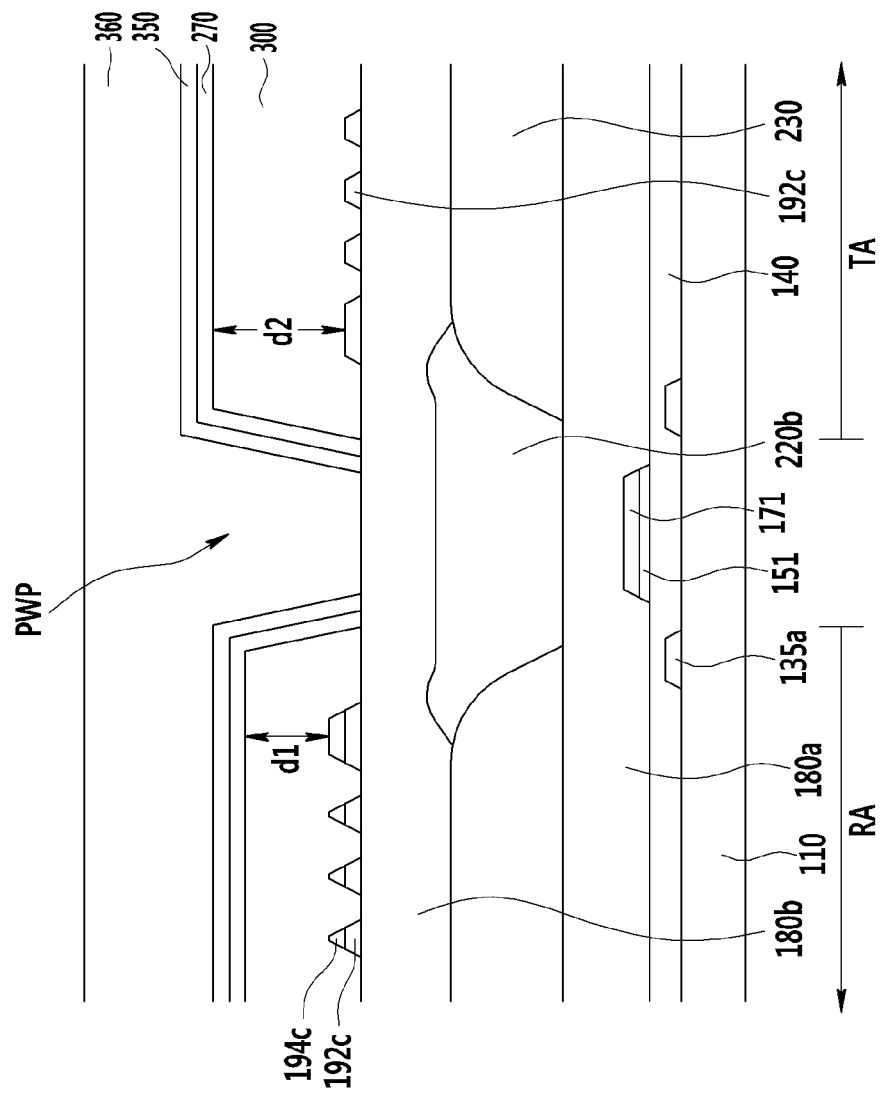

Referring to FIGS. 9 and 10, the common electrode 270, the lower insulating layer 350, and the roof layer 360 are sequentially formed on the sacrificial layer 300. The roof layer 360 may be removed in a region corresponding to the horizontal light blocking member 220a disposed between adjacent pixel areas in the vertical direction using a photolithography process. As a result, a portion of the lower insulating layer 350 corresponding to the horizontal light blocking member 220a is exposed by the opening in the roof layer 360. As previously described, the common electrode 270, the lower insulating layer 350, and the roof layer 360 are formed in the open portion OPN of the vertical light blocking member 220b, so as to form the partition wall formation portion PWP.

The roof layer 360 has a substantially greater thickness than the common electrode 270 or the lower insulating layer 350. An interlayer step is thus created between the reflective area RA and the transmissive area TA due to the sacrificial layer 300 having different thicknesses. As a result, the thickness of the roof layer 360 in the reflective area RA may be greater than the thickness of the roof layer 360 in the transmissive area TA (as illustrated in FIG. 9).

Figure 11:
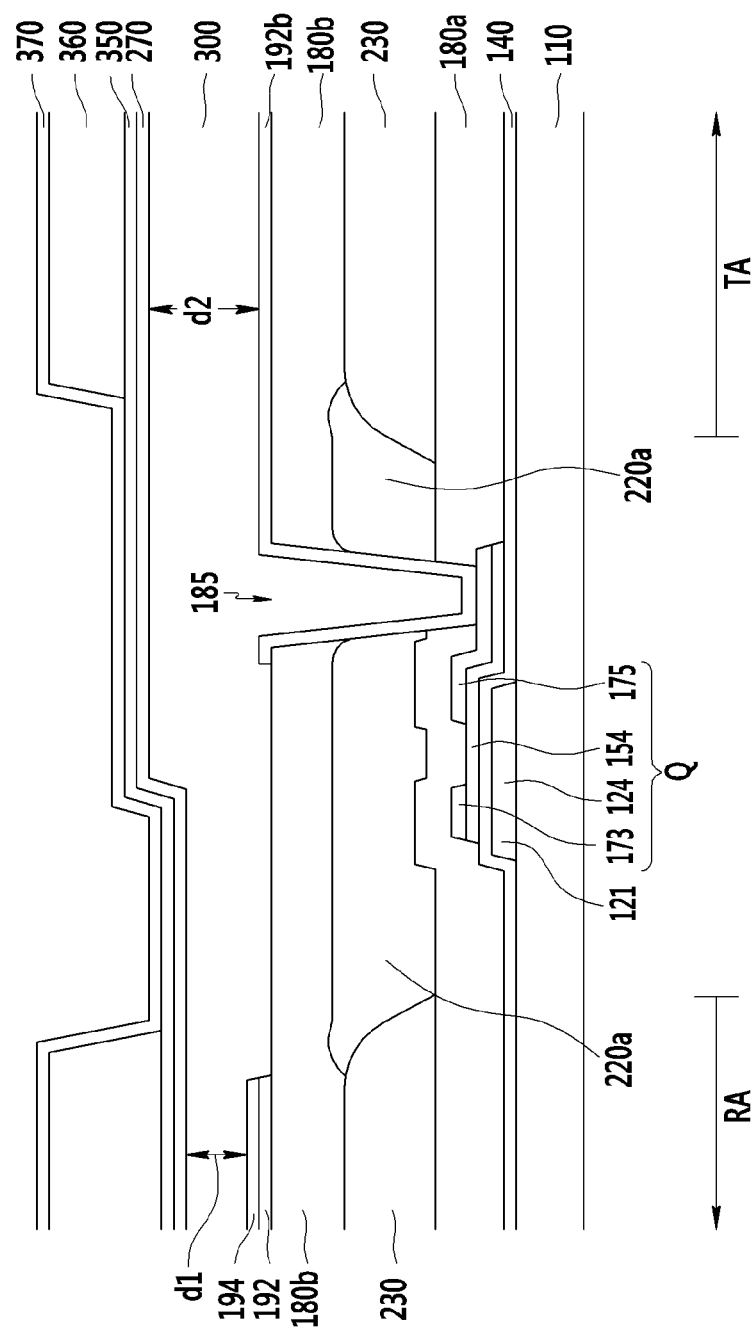
Figure 12:
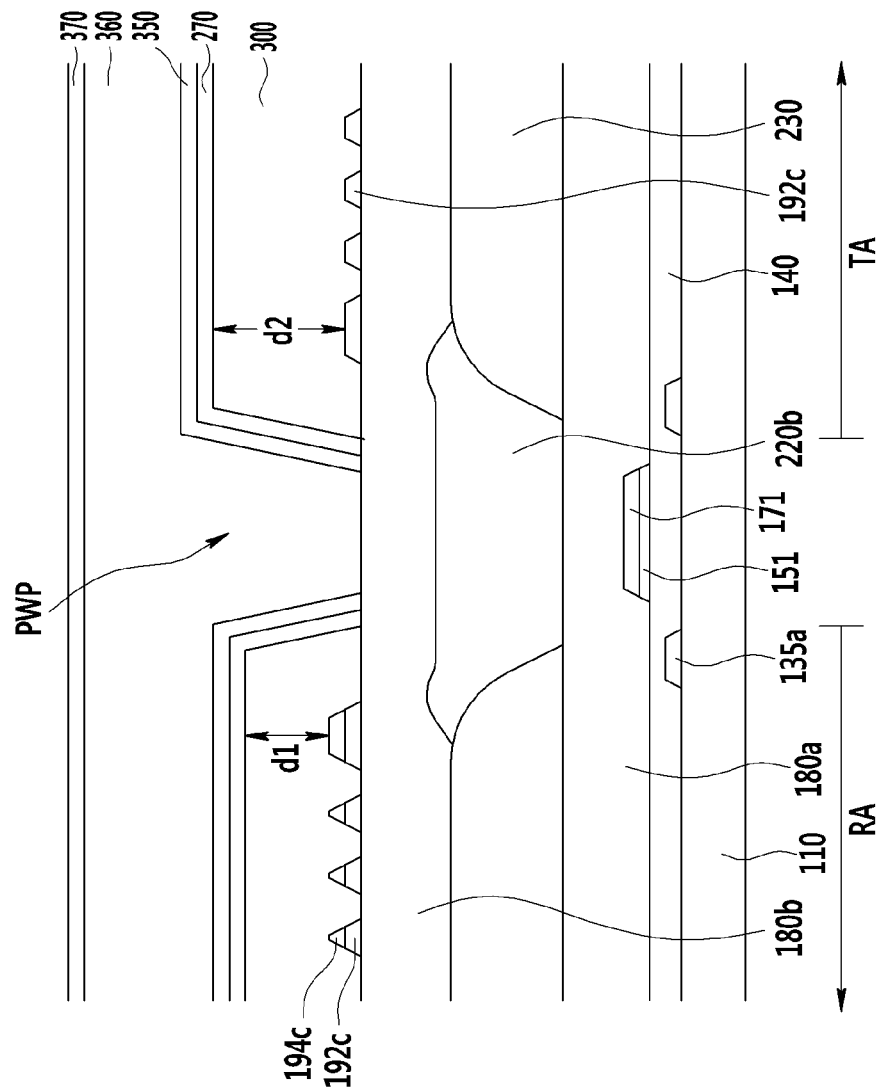

Referring to FIGS. 11 and 12, the upper insulating layer 370 is formed covering the roof layer 360 and the exposed portion of the lower insulating layer 350.

Figure 13:
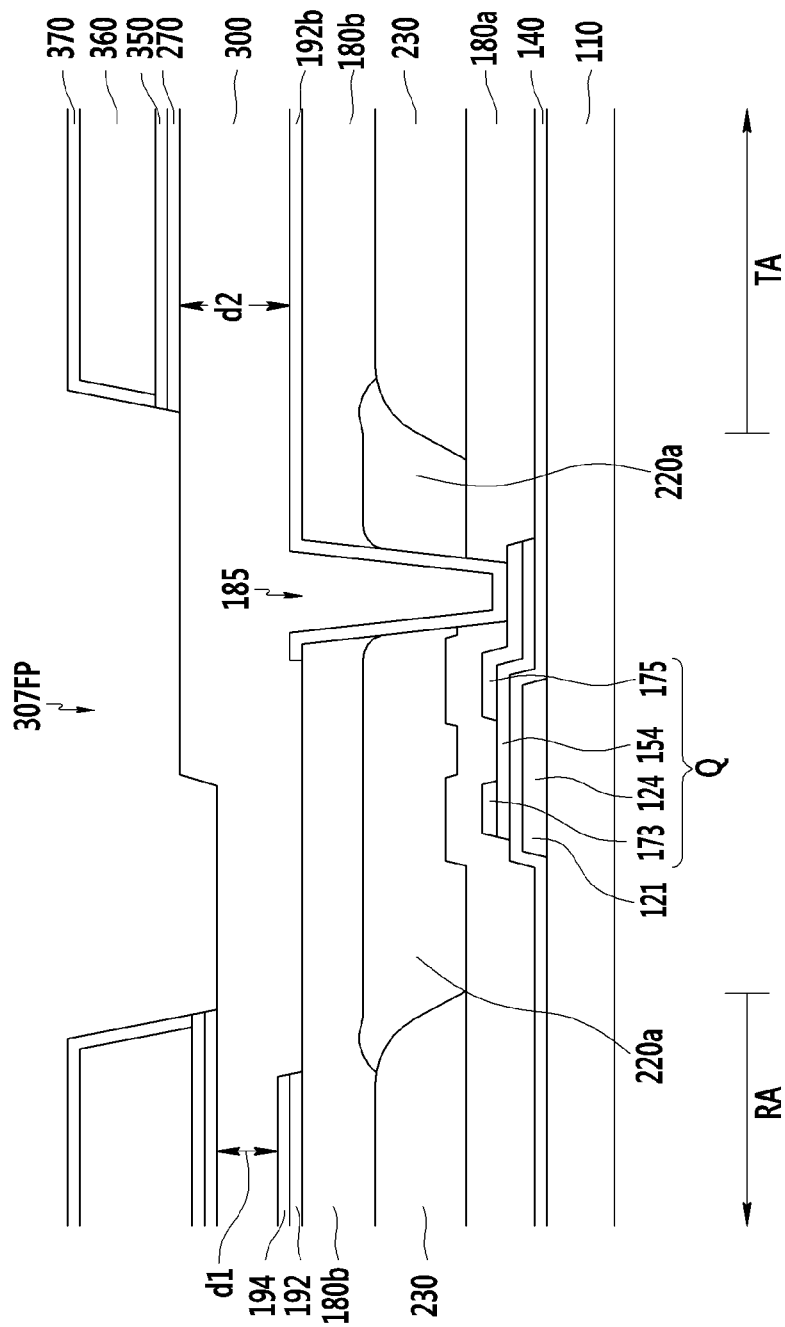

Referring to FIG. 13, the upper insulating layer 370, the lower insulating layer 350, and the common electrode 270 are partially removed by dry-etching the upper insulating layer 370, the lower insulating layer 350, and the common electrode 270 to form the liquid crystal injection hole formation region 307FP. In this case, the upper insulating layer 370 may have a structure covering the side of the roof layer 360, but is not limited thereto. For example, in some other embodiments, the upper insulating layer 370 covering the side of the roof layer 360 may be removed to expose the side of the roof layer 360.

Figure 14:
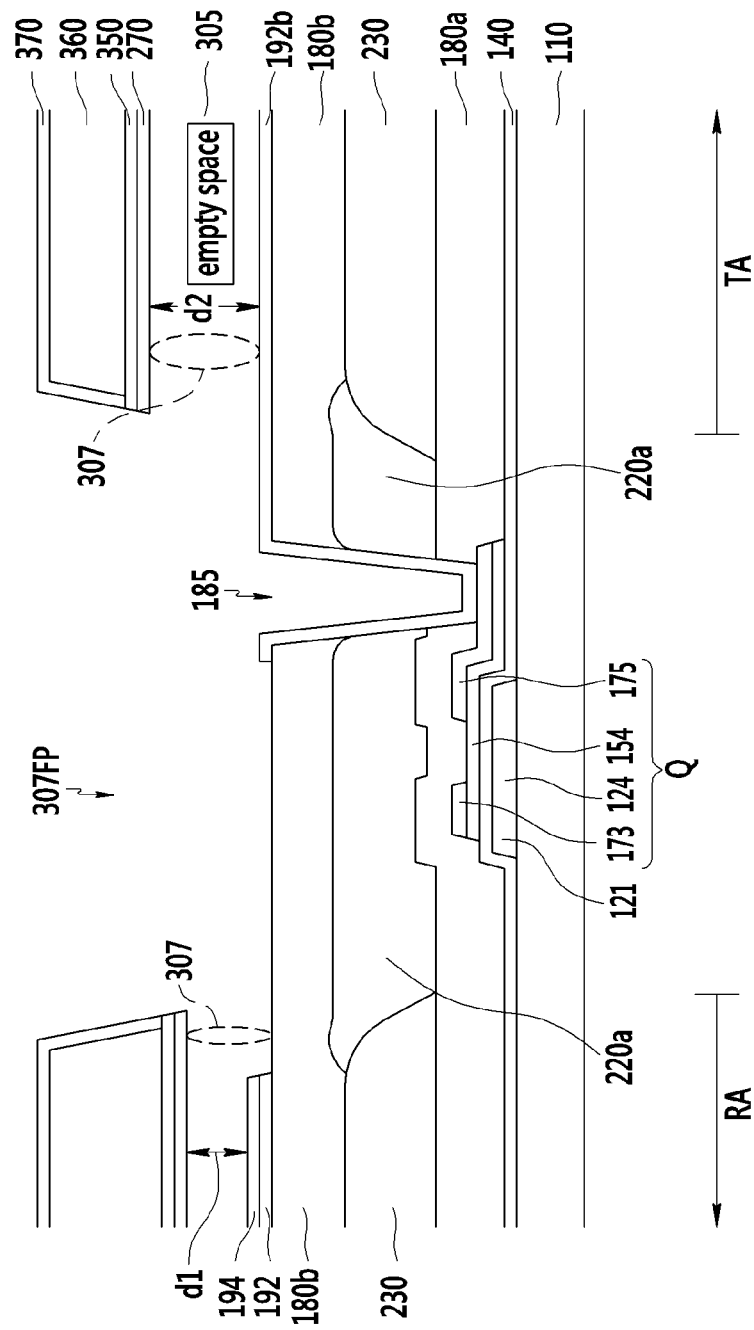
Figure 15:
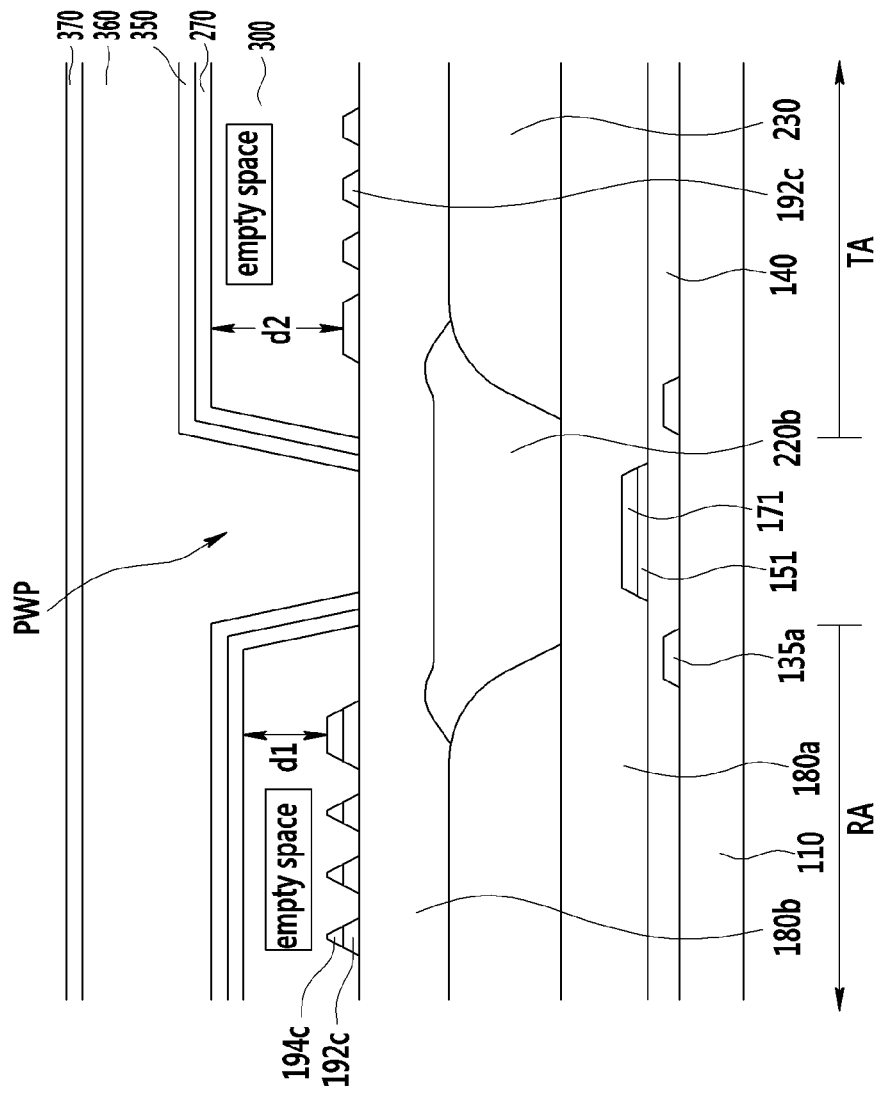

Referring to FIGS. 14 and 15, the sacrificial layer 300 is removed from the liquid crystal injection hole formation region 307FP by an oxygen (O2) ashing process or a wet-etching method, thereby forming the microcavity 305 with the liquid crystal injection hole 307. The microcavity 305 is an empty space that is formed when the sacrificial layer 300 is removed.

Figure 16:
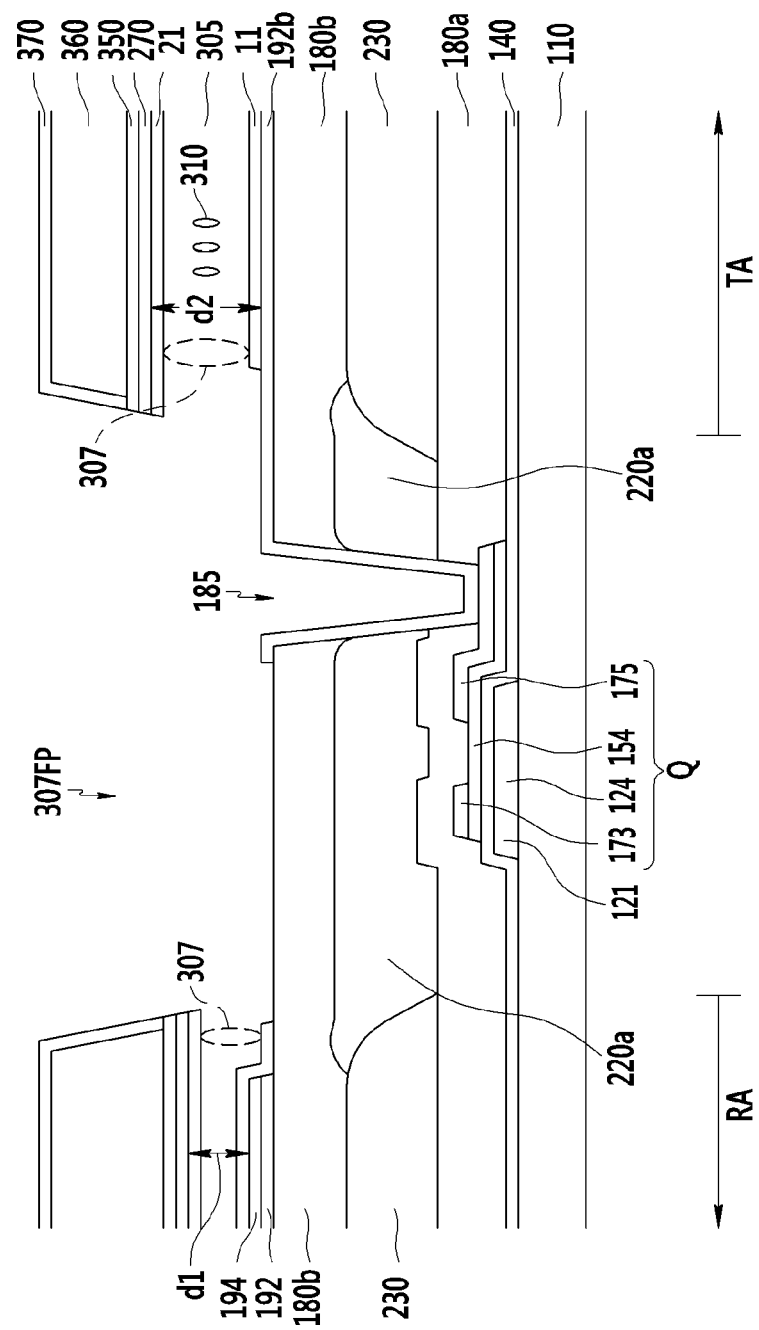
Figure 17:
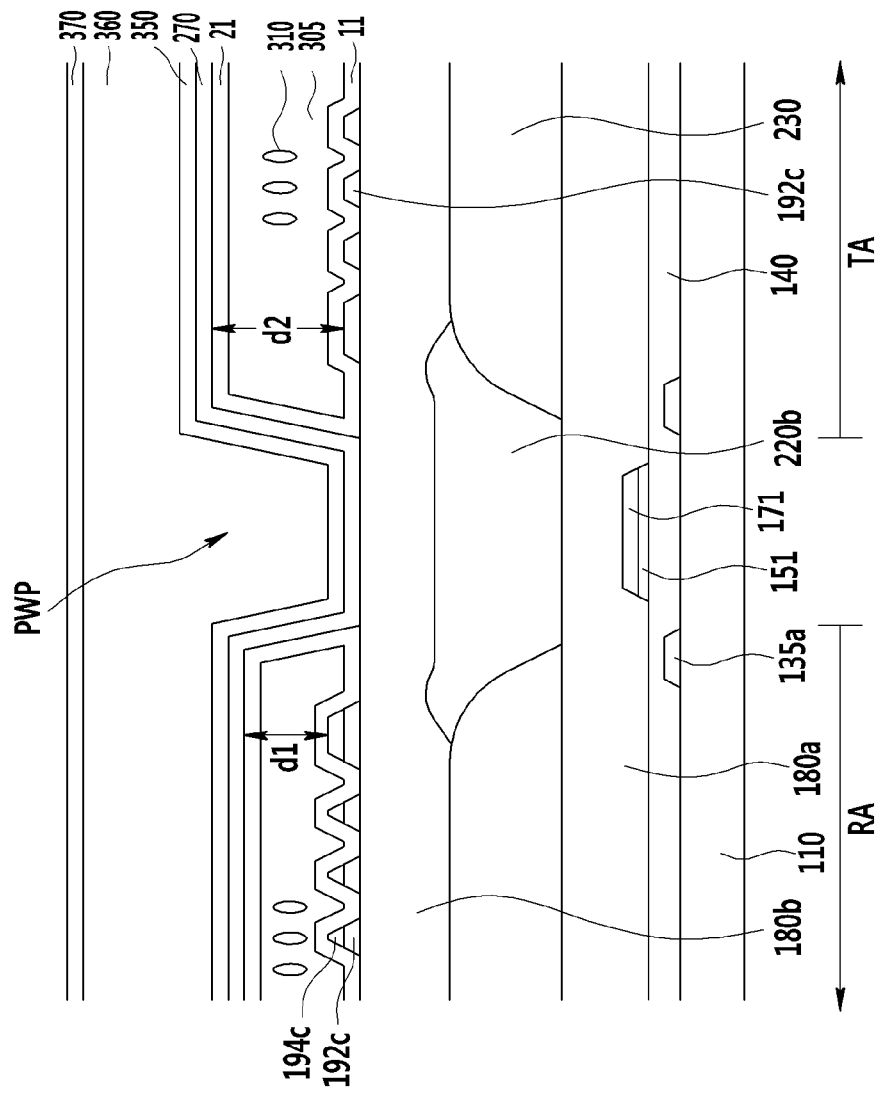

Referring to FIGS. 16 and 17, the alignment layers 11 and 21 are formed on the pixel electrode 191 and the common electrode 270 by injecting the aligning material through the liquid crystal injection hole 307. The aligning material includes a solid and a solvent. Thereafter, a bake process is performed so as to drive the solvent from the aligning material.

Next, the liquid crystal material including the liquid crystal molecules 310 is injected into the microcavity 305 through the liquid crystal injection hole 307 using an inkjet method and the like.

Thereafter, the capping layer 390 is formed on the upper insulating layer 370 to cover the liquid crystal injection hole 307 and the liquid crystal injection hole formation region 307FP, thus forming the liquid crystal display illustrated in FIGS. 2 and 3.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A method of manufacturing a liquid crystal display, comprising:
   forming a thin film transistor on a substrate;
   forming a pixel electrode, wherein the pixel electrode is connected to a terminal of the thin film transistor;
   forming a sacrificial layer on the pixel electrode, wherein the sacrificial layer includes a first portion having a first thickness and a second portion having a second thickness, wherein the first portion and a second portion are separated by a liquid crystal injection hole formation region;
   forming a roof layer on the sacrificial layer;
   forming, by removing the sacrificial layer, a plurality of microcavities having a liquid crystal injection hole;
   injecting an alignment material and a liquid crystal material into the plurality of microcavities through the liquid crystal injection hole; and
   forming a capping layer on the roof layer to cover the liquid crystal injection hole and the liquid crystal injection hole formation region,
   wherein the liquid crystal injection hole formation region is positioned between adjacent microcavities of the plurality of microcavities, and
   wherein the first portion of the sacrificial layer corresponds to a reflective area, and the second portion of the sacrificial layer corresponds to a transmissive area.

2. The method of claim 1, wherein the first thickness corresponds to a cell gap of the reflective area, and the second thickness corresponds to a cell gap of the transmissive area.

3. The method of claim 2, wherein a thickness of the roof layer in the reflective area is greater than a thickness of the roof layer in the transmissive area.

4. The method of claim 3, wherein forming the sacrificial layer on the pixel electrode further comprises:
   forming the first portion and the second portion alternately in a direction of a gate line connected to the thin film transistor.

5. The method of claim 3, wherein forming the sacrificial layer on the pixel electrode further comprises:
   forming the first portion and the second portion alternately in a direction of a data line connected to the thin film transistor.

6. The method of claim 3, further comprising:
   forming a common electrode and a lower insulating layer on the sacrificial layer before forming the roof layer.

* * * * *